US011803977B2

(12) United States Patent
Bosse et al.

(10) Patent No.: US 11,803,977 B2
(45) Date of Patent: Oct. 31, 2023

(54) LIDAR POINT CLOUD ALIGNMENT VALIDATOR IN HD MAPPING

(71) Applicant: Zoox, Inc., Foster City, CA (US)

(72) Inventors: Michael Carsten Bosse, Templeton, CA (US); Veeresh Taranalli, San Jose, CA (US); Elena Stephanie Stumm, Berkeley, CA (US)

(73) Assignee: Zoox, Inc., Foster City, CA (US)

( * ) Notice: Subject to any disclaimer, the term of this patent is extended or adjusted under 35 U.S.C. 154(b) by 151 days.

(21) Appl. No.: 17/549,516

(22) Filed: Dec. 13, 2021

(65) Prior Publication Data

US 2023/0186494 A1 Jun. 15, 2023

(51) Int. Cl.
*G06T 7/30* (2017.01)
*G06V 10/74* (2022.01)
*G06V 20/56* (2022.01)
*G06V 10/764* (2022.01)

(52) U.S. Cl.
CPC .............. *G06T 7/30* (2017.01); *G06V 10/761* (2022.01); *G06V 10/764* (2022.01); *G06V 20/56* (2022.01); *G06T 2207/10028* (2013.01)

(58) Field of Classification Search
None
See application file for complete search history.

(56) References Cited

U.S. PATENT DOCUMENTS

| 2017/0278231 | A1* | 9/2017 | Narasimha | G06T 7/277 |
| 2019/0279049 | A1 | 9/2019 | Doria et al. | |
| 2021/0370968 | A1* | 12/2021 | Xiao | G01S 17/86 |
| 2022/0286305 | A1* | 9/2022 | Tan | H04L 63/0823 |
| 2022/0292771 | A1* | 9/2022 | Yang | G06T 7/30 |

FOREIGN PATENT DOCUMENTS

| CN | 112703368 A | 4/2021 |
| KR | 20150145950 A | 12/2015 |
| KR | 20200053499 A | 5/2020 |
| KR | 20130026853 A | 3/2023 |

OTHER PUBLICATIONS

International Search Report and Written Opinion dated Apr. 27, 2023, for International Application No. PCT/US2022/051842.

* cited by examiner

*Primary Examiner* — Frank S Chen
(74) *Attorney, Agent, or Firm* — EIP US LLP

(57) ABSTRACT

Techniques are described for determining whether a point cloud registration (e.g., alignment) between two sets of data points is valid. Such techniques can include determining voxelized representations of the sets of data points, and comparing characteristics of spatially aligned voxels within the voxelized representations. Characteristics of voxels to be compared can include classification labels of data points associated with voxels, including whether or not voxels correspond to free space. Point cloud registrations determined to be invalid can be given a weighting to be used in a subsequent high definition (HD) map building process. Generated maps can then be deployed for use in autonomous vehicles.

20 Claims, 7 Drawing Sheets

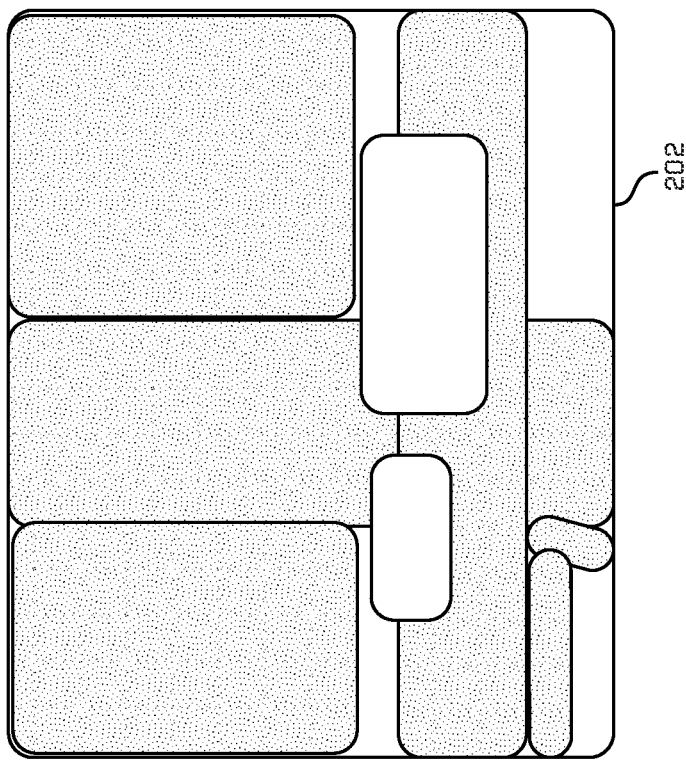
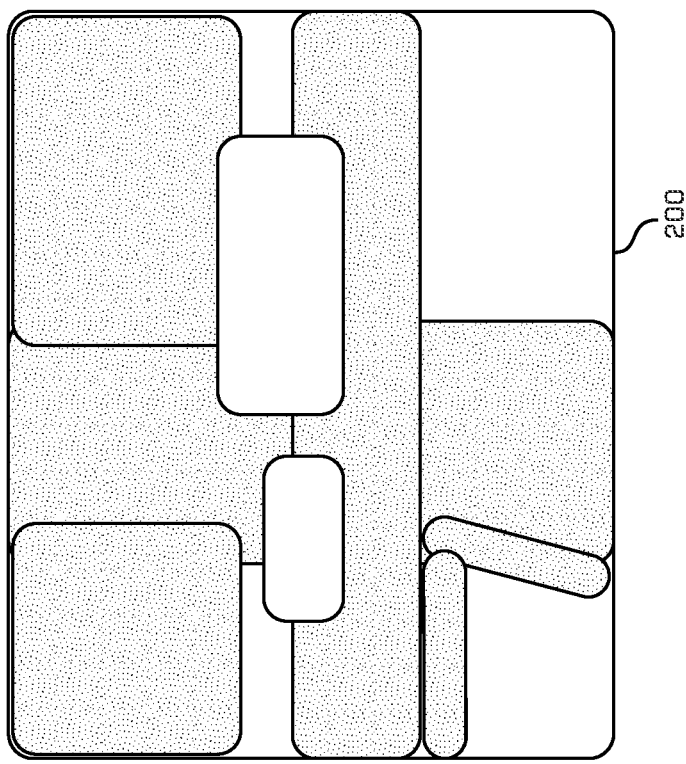
FIG. 2

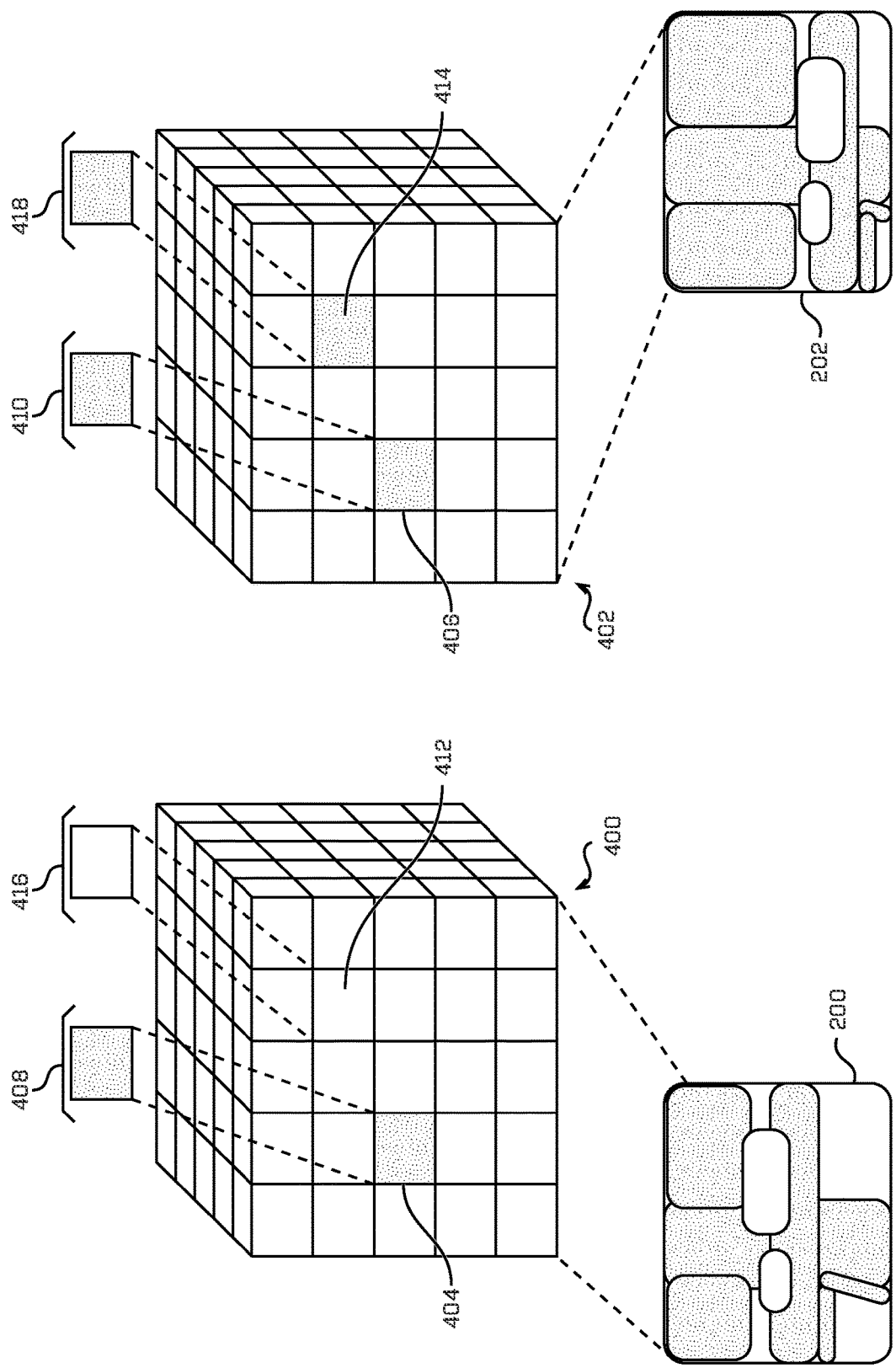

LIDAR POINT CLOUD ALIGNMENT VALIDATOR IN HD MAPPING

BACKGROUND

An autonomous vehicle may navigate in an environment at least partially based on a map of the environment. Such an autonomous vehicle may comprise sensors, such as LIDAR sensors, radar sensors, and other imaging sensors, which can be used to obtain data representative of the environment, with the data then used in a mapping process to generate a map or update an existing map. However, errors in the map or mapping process may create unsafe situations for those systems which rely on accurate maps, such as in the case with autonomous vehicles as an example.

BRIEF DESCRIPTION OF DRAWINGS

The detailed description is described with reference to the accompanying figures. The use of the same reference numbers in different figures indicates similar or identical components or features.

FIG. 2 is a schematic illustration of first and second sets of data points;

FIG. 4 is a schematic illustration of first and second voxel grids;

DETAILED DESCRIPTION

Figure 1:
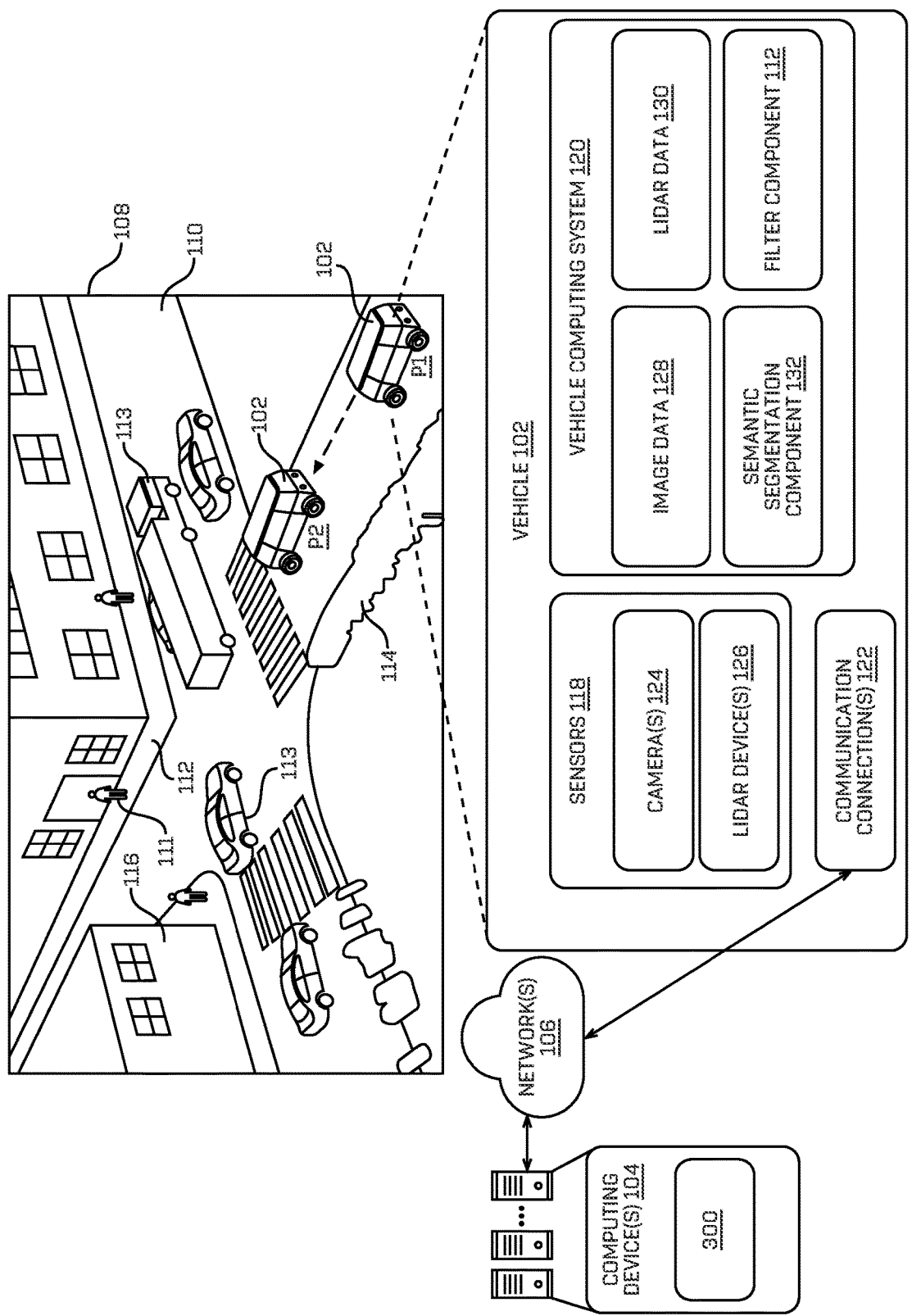
FIG. 1 is a first schematic illustration of a system comprising a vehicle and one or more computing device(s)

This application relates to determination of the validity of a point cloud registration between two sets of data points (e.g., how well one point cloud data set can be aligned with another), typically two sets of LIDAR data points, that are intended to be used in a map generating process. High Definition (HD) maps used by autonomous vehicles can typically be created by aligning, via point cloud registrations, sets of sparse sensor data corresponding to poses of one or more vehicles (one or more of a position and/or orientation). Aligned sets of sparse sensor data can then be used in a subsequent pose estimation algorithm, which can include an optimization algorithm to generate a final map. The point cloud registrations can be achieved by enforcing generated constraints that exploit redundancies in sensor data. As an example, when using LIDAR sensors, there can be significant overlap in sensor observations of real-world objects in the environment of the vehicle, particularly where the sensor(s) or the vehicle travels a short distance between sensor readings. This overlap can be referred to as co-visibility, and can be useful to register two LIDAR point clouds to each other to establish constraints between the respective sparse sets of sensor data, with such constraints also referred to as factors.

When creating such factors during a HD map building process, invalid factors can be established for to a variety of reasons, including but not limited to: insufficient co-visibility; a problem with a LIDAR point cloud registration algorithm; and the pair of LIDAR point clouds simply being too challenging for the LIDAR point cloud registration algorithm to align (e.g., where there is a lack of features, such as on bridges and highways, where there are issues with data, such as in rain or snow, and the like), to name a few. However, such invalid factors can be detrimental to the subsequent pose estimation algorithm, which can result in failure of the HD map building process. In such circumstances, manual intervention can be required to establish invalid factors and complete the HD map building process, which can be inefficient and time-consuming.

In the present application, voxelized representations of two sets of point cloud data are determined, with invalidity of a point cloud registration between the two sets of point cloud data then determined based on a comparison of characteristics between pairs of voxels within the voxelized representations. This method can be a computer implemented method which can reduce the need for human intervention in a HD map building process that utilizes the two sets of point cloud data. By comparing characteristics of voxels, instead of comparing characteristics of individual data points, effects of noise and discretization can be minimized.

The characteristics of the voxels can take different forms, including semantic classification labels applied to data points between the first and second sets of data points. In the present application, for two sets of data points that are expected to be aligned by a point cloud registration, semantic classification labels for data points in the same region of 3D space, i.e. within pairs of voxels that are at least partially aligned, should match each other for the point cloud registration to be considered valid. Thus, a check on semantic classification labels of pairs of voxels that are at least partially aligned can be utilized to determine whether a given point cloud registration is invalid.

Another characteristic of the voxels can include whether or not a voxel corresponds to free space for the given pose. In the present application, if a point cloud registration is valid, then there should not be any data points from one point cloud in a region of space that is observed to be free space in the other point cloud. By considering a number of data points, e.g. a cardinality of a sub-set of data points associated with a given voxel, and comparing the number/cardinality to a threshold, a determination as to whether or not a voxel corresponds to free space for a given point cloud can be made, for example with free space indicated where the cardinality is less than or equal to the cardinality threshold. Free space can also be determined by use of a ray casting method by, for example, noting any voxels through which a ray passes as likely free space (and/or in which less than a threshold number of points are cast). A comparison between voxels of a pair of voxels that are at least partially aligned can then be used to determine whether or not free space voxels correspond, and hence whether a given point cloud registration is invalid.

Where a point cloud registration is determined to be invalid based on a comparison of any of the characteristics discussed above, such a registration can be given a lower weighting in a subsequent pose estimation algorithm used in a map building process. This may result in a greater map accuracy. In at least some examples, such accuracy may be obtained by allowing a global optimization to alter the pose associated with the lower weighting more than with respect to data associated with higher weights. Maps can then be deployed in vehicles, for example autonomous vehicles, for future use.

Accordingly, techniques (including, but not limited to, a method, a system, and one or more non-transitory computer-readable media) may be provided as discussed herein.

A system 100 is illustrated schematically in FIG. 1, and includes a vehicle 102 and a computing device 104 connected to the vehicle over a network 106. The vehicle 102 can be configured to travel in an environment 108, which can comprise static objects such as road surfaces 110, sidewalks 112, vegetation 114 and buildings 116, as well as dynamic objects such as pedestrians 111 and vehicles 113. As the vehicle 102 travels through the environment 108, the vehicle 102 can adopt different positions and/or orientations, i.e. poses, with a first pose illustrated as P1 in FIG. 1, and a second pose illustrated as P2 in FIG. 1.

For the purpose of illustration, the vehicle 102 can be an autonomous vehicle configured to operate according to a Level 5 classification issued in 2013 by the U.S. National Highway Traffic Safety Administration, which describes a vehicle capable of performing all safety-critical functions for the entire trip, with the driver (or occupant) not being expected to control the vehicle at any time. This is merely an example, and the systems and methods described herein may be incorporated into any vehicle and/or robot, including those ranging from vehicles that need to be manually controlled by a driver at all times, to those that are partially autonomously controlled, such that they can be autonomously controlled without driver attention or assist during certain driving conditions, such as, for example, while operating on limited-access highways, but such that they require driver attention and/or assistance during other driving conditions, such as, for example, while operating on city streets in urban areas, or during at least some parking functions.

The vehicle 102 can comprise sensors 118, a vehicle computing system 120, and one or more communication connection(s) 122. The sensors 118 can include one or more cameras 124 and one or more LIDAR devices 126. The vehicle 102 can use the camera(s) 124 to capture image data 128 of the environment 108. Furthermore, the vehicle 102 can use the LIDAR device(s) 126 to capture LIDAR data 130 of the environment 100.

The vehicle computing system 120 can receive the image data 128 and the LIDAR data 130, and can include a semantic segmentation component 132 and a filter component 134. The semantic segmentation component 132 can cause the vehicle computing system 120 to perform semantic segmentation on the image data 128 to determine pixel classification probability distributions associated with pixels of the image data 128. In at least some examples, such classifications can correspond to static objects such as road surface, sidewalk, vegetation and buildings 11, as well as dynamic objects such as pedestrian and vehicle 113, along with free space and the like. In such a manner, the image data 128 can be provided with semantic classification labels.

The LIDAR data 130 can include sets of data points, also referred to herein as point clouds, with each set of data points corresponding to a particular pose of the vehicle 102 within the environment 108 (e.g., data points in the environment will be relative to the local position and/or orientation of the vehicle when captured). Although the poses P1 and P2 are illustrated here for a single vehicle 102, it will be appreciated that in other examples the LIDAR data 130 can correspond to poses of different vehicles in the same environment 108, e.g. in the same geographic location. Furthermore, the LIDAR data 130 for the first P1 and second P2 poses need not necessarily be obtained at the same time, e.g. with LIDAR data 130 for the second pose P2 not necessarily obtained immediately following the LIDAR data 130 for the first pose P1. Illustrative first 200 and second 202 sets of data points, i.e. first and second point clouds, are shown in FIG. 2, with the first set of data points 200 corresponding to the first pose P1 of the vehicle 102, and the second set of data points 202 corresponding to the second pose P2 of the vehicle 102. Dotted boxes in FIG. 2 illustrate objects represented by LIDAR point cloud data. Blank boxes in FIG. 2 are intended to correspond to dynamic, i.e. moving objects, which, at least in some examples, may be discarded or otherwise not utilized when performing an alignment/registration. It will be appreciated that the first 200 and second 202 sets of data points may have been simplified for ease of illustration relative to the environment 108 depicted in FIG. 1.

The vehicle computing system 120 can perform operations to associate individual data points within the LIDAR data 130 with respective semantic classification labels determined by the semantic segmentation component 132. The filter component 134 can filter dynamic objects from the LIDAR data 130, for example by utilizing the semantic classification labels determined by the semantic segmentation component 132. Filtered and labelled LIDAR data 130 can then be passed from the vehicle 102 to the computing device 104 over the network 106 via the communication connection(s) 122.

In some examples, LIDAR data 130 obtained by the vehicle can be utilized by the computing device 104 to determine a map, e.g. high definition (HD) map of the environment 108 of the vehicle 102. To do so, the computing device 104 can perform a map building procedure utilizing the LIDAR data 130, amongst other things, as an input. In particular, utilizing the LIDAR data 130 as an input, the computing device 104 can determine validity of alignments, i.e., point cloud registrations, between sets of data points, such as the first 200 and second 202 sets of data points illustrated in FIG. 2, with such validity being taken into account during a subsequent pose estimation algorithm performed on a set of point clouds. As illustrated therein, differing bounded and shaded areas may represent point returns associated with varying classifications.

Figure 3:
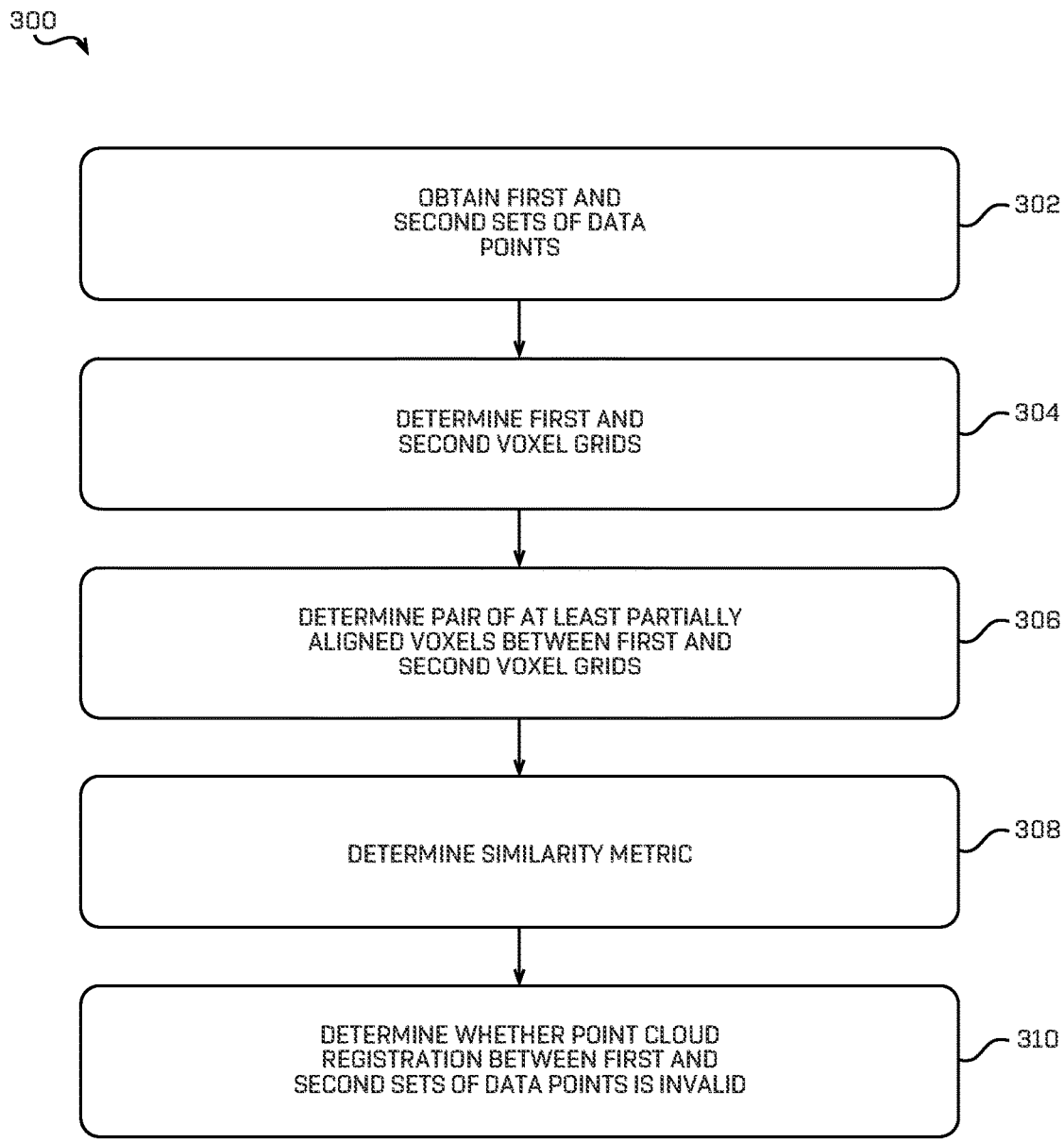
FIG. 3 is a flow diagram illustrating a determination as to whether a point cloud registration is invalid.

A method 300 performed by one or more processors 136 of the computing device 104 is illustrated schematically in FIG. 3. The method 300 can comprise obtaining 302 first and second sets of data points corresponding to respective first and second poses of the vehicle 102. The method 300 can comprise determining 304 first and second voxel grids corresponding to the first and second sets of data points in a frame of reference, for example a common frame of reference obtained via an appropriate alignment/point cloud registration between the first and second sets of data points. As a non-limiting example of such, the one or more voxels of the voxel grid may be associated with a position, orientation, and/or extents. In such examples, points of the set of data points may be associated with the one or more voxels based at least in part on the location associated therewith and/or the pose of the vehicle. The method 300 can comprise determining 306 a pair of voxels which are at least partially aligned between the first and second voxel grids. The method 300 can comprise determining 308, based at least in part on a comparison between a first characteristic of a first voxel of the pair and a second characteristic of a second voxel of the pair, a similarity metric. The method 300 can comprise determining 310, based at least in part on the similarity metric, whether a point cloud registration between the first and second sets of data points is invalid.

In some examples, as in the example of FIG. 1 above, obtaining 302 of first and second sets of data points, e.g. first and second sets of LIDAR data points, can occur via receipt of LIDAR data 130 from the vehicle 102. However, it will be appreciated that other examples are also envisaged, for example where the first and second sets of LIDAR data points are obtained from memory of the computing device 104, or from other remote computing devices not forming part of the vehicle 102. In further examples data other than LIDAR data can be utilized, with any data associated with a depth measurement, e.g. radar, sonar, stereo cameras, and structured light also envisaged. Indeed, any appropriate sets of data points can be utilized, for example where the data points correspond to sensor data indicative of an environment to be mapped. In some examples, sets of data points from more than one source can be utilized, for example in the form of LIDAR sensor data taken from more than one vehicle at the same geographic location, differing sensor modalities providing depth data, and the like.

It will further be appreciated that the LIDAR data 130 transmitted from the vehicle 102 to the computing device 104 need not necessarily be labelled or filtered prior to transmission. In some examples such labelling and filtering can take place at the computing device 104, or indeed in some examples labelling or filtering need not necessarily take place.

In some examples, determining 304 first and second voxel grids corresponding to the first and second sets of data points in a frame of reference can take place via appropriate projection of first and second sets of data points, or overlaying of the first and second voxel grids onto the first and second sets of data points after an alignment transformation has been performed on the relevant set of data points. Such voxel grids are illustrated schematically in FIG. 4 in respect of the first 200 and second 202 sets of data points of FIG. 2, to obtain respective first 400 and second 402 voxel grids. The size of each voxel within the first 400 and second 402 voxel grids can be determined according to desired resolution, with the desired resolution pre-set and the determination of the size of the voxel grids not forming part of the method 300 discussed above. In some examples, each voxel has a 2 m×2 m 2×m dimensionality. As can be seen in FIG. 4, when projected into the respective first 400 and second 402 voxel grids, data points within the respective first 200 and second 202 sets of data points can be located in sub-sets, be they zero or non-zero sub-sets, within voxels of the first 400 and second 402 voxel grids. For example, when considering any voxel of the first 400 and second 402 voxel grids, only a portion of the corresponding first 200 and second 202 sets of data points will be located within that voxel, and such a portion can be referred to as a subset of the respective first 200 and second 202 sets of data points herein.

A pair of voxels determined 306 according to the method 300 are schematically shown as a first voxel 404 and a second voxel 406. As illustrated in the example of FIG. 4, the pair of voxels, e.g. the first voxel 404 and the second voxel 406 can be considered to be spatially aligned, with the first 404 and second 406 voxels corresponding to the same 2 m×2 m×2 m section of 3D space. In other examples, however, the first 404 and second 406 voxels can be only partially aligned. In such examples, the pair of voxels can be determined via a consideration of next nearest neighbors or the like. As illustrated in the example of FIG. 4, the first 404 and second 406 voxels can comprise respective non-empty sub-sets 408,410 of the first 200 and second 202 sets of data points, although as will be appreciated from the other voxels not labelled in FIG. 4 this is not always the case, with pairs of empty voxels and pairs of empty and non-empty voxels also occurring. It will further be appreciated that not all occupied voxels are indicated in FIG. 4 for the sake of clarity. Here a non-empty sub-set can be considered to be a sub-set of the respective first 200 and second 202 sets of data points that consists of one or more of the data points, whereas an empty sub-set can be considered a sub-set of the respective first 200 and second 202 sets of data points that consists of none of the data points.

As noted above, determining 308, a similarity metric can take part based at least in part on a comparison between a first characteristic of the first voxel 404 of the pair and a second characteristic of the second voxel 406 of the pair, and determining 310 whether a point cloud registration between the first and second sets of data points is invalid can take part based at least in part on the similarity metric. It will be appreciated that how the similarity metric is determined can depend on the characteristic to be compared.

In some examples, the characteristic to be compared can comprise classification labels, e.g. semantic classification labels, of data points within the respective sub-sets of data points associated with the voxels to be compared. For example, first classification labels of the first sub-set 408 of the first set of data points 200 associated with the first voxel 404 of FIG. 4 can be compared to second classification labels of the second sub-set 410 of the second set of data points 202 associated with the second voxel 406 of FIG. 4.

Given that the first voxel 404 and the second voxel 406 are spatially aligned in the same frame of reference, for a valid point cloud registration based on a given transformation, such as a six-degree-of-freedom transformation, it is to be expected that the first classification labels of the first sub-set 408 of the first set of data points 200 associated with the first voxel 404 should match, or at least substantially correspond, to second classification labels of the second sub-set 410 of the second set of data points 202 associated with the second voxel 406. Where this isn't the case, i.e. where dissimilarities in classification labels occur between the first 404 and second 406 voxels, an invalid alignment can be determined. As an illustrative example, if the first sub-set 408 of the first set of data points 200 associated with the first voxel 404 were to comprise classification labels indicative of a building, whereas the second sub-set 410 of the second set of data points 202 associated with the second voxel 406 were to comprise classification labels indicative of vegetation, it can be determined that an alignment between the first 200 and second 202 sets of data points is invalid. Where voxels comprise a mix of classification labels, the distribution of the classification labels can be considered.

In some examples, the comparison of voxel characteristics can take place for a number, or indeed all, of the pairs of voxels in the first 400 and second 402 voxel grids, with a count kept of pairs of similar and/or dissimilar voxels. Such a count can then be compared to a similarity threshold, which can be appropriately set depending on a desired similarity, to determine whether a point cloud registration between the first 200 and second 202 sets of data points is invalid.

It will be appreciated that even for a valid point cloud registration between the first 200 and second 202 sets of data points, there may be some classification labels for corresponding data points between the first 408 and second 410 sub-sets, i.e. between the first and second voxels, that do not correspond. Therefore, in some examples a distribution of classification labels can be monitored for each pair of voxels.

In some examples, a first distribution, e.g. a histogram of classification labels can be determined for the first voxel 404 of the pair of voxels and a second distribution, e.g. a histogram, of classification labels can be determined for the second voxel 406 of the pair of voxels. These distributions can then be used to determine a similarity metric for the first 404 and second 406 voxels. In some examples, distances between distributions can be utilized as similarity metrics as discussed herein.

In some examples, where the distributions are plotted as histograms, the first and second histograms can be normalized, and the L1, or Manhattan distance, between the two normalized histograms can be computed, for example by summing the distance between corresponding bins of the first and second histograms. Such an L1, or Manhattan, distance can be referred to as a similarity metric herein. This can give a value that is bounded between the values of 0 and 2 for the pair of voxels. By doing this for a number, or indeed each, pair of voxels within the first 400 and second 402 voxel grids, a number of distances, i.e. similarity metrics, can be obtained, and these distances, i.e. similarity metrics can be aggregated into a third histogram which can be used to determine whether a point cloud registration between the first 200 and second 202 sets of data points are invalid. For example, an expected value of the third histogram, or a sample mean of the data of the third histogram, can be determined, and then subsequently compared to a threshold value. Where the expected value of the third histogram is greater than or equal to the threshold value, an invalid point cloud registration can be determined.

Figure 5A:
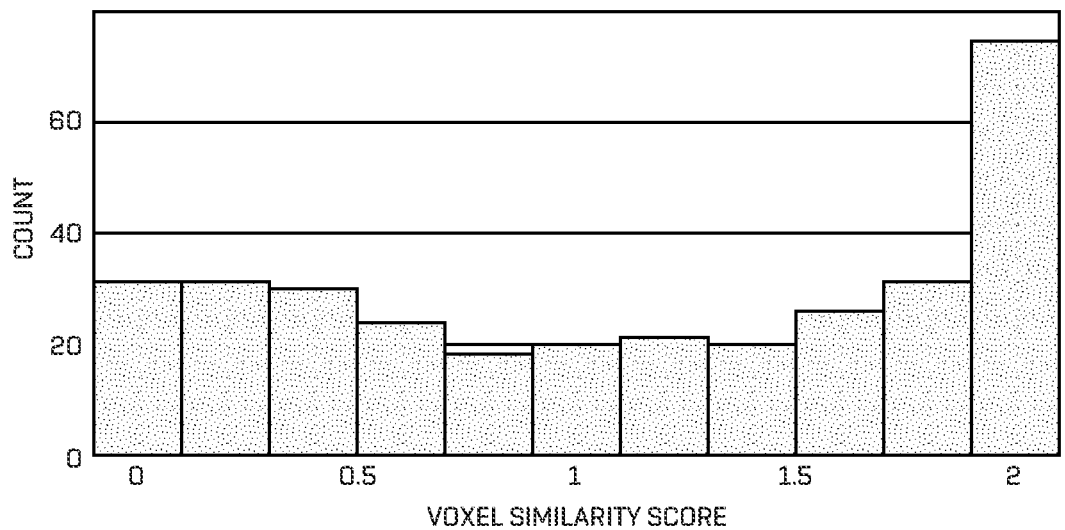
FIG. 5a is a schematic illustration of a histogram for an invalid point cloud registration.
Figure 5B:
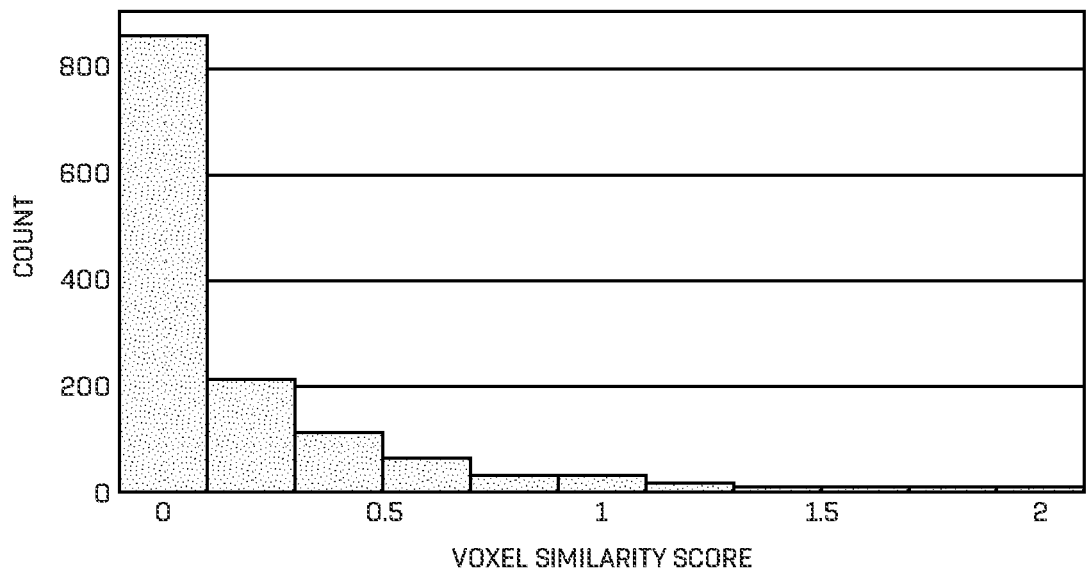
FIG. 5b is a schematic illustration of a histogram for a valid point cloud registration.

Illustrative examples of such third histograms for both invalid and valid point cloud registrations can be seen in FIGS. 5a and 5b respectively.

In some examples, a Pearson chi-squared test can be performed on the first and second histograms to obtain a similarity metric in the form of a p-value, and the p-value can be compared to a defined similarity threshold to determine whether the pair of the first voxel 404 and the second voxel 406 are considered to be similar or not. By performing such a Pearson chi-squared test for each pair of voxels in the first 400 and second 402 voxel grids, and keeping track of the number of pairs determined as similar and dissimilar, a probability of an invalid point cloud registration between the first 200 and second 202 sets of data points can be determined as:

Probability of invalid registration=Number of dissimilar voxels/Number of matching voxels.

The determined probability can then be compared to a threshold probability, and where the determined probability is greater than or equal to the threshold probability, an invalid point cloud registration can be determined.

Although two histogram distance metrics have been described above, it will be appreciated the other histogram distance metrics can be utilised, where appropriate. In each case, the semantic classification labels of the first 200 and second 202 sets of data points can be utilised as characteristics of voxels of the first 400 and second 402 voxel grids to determine a similarity metric between the voxels, with the similarity metrics then utilized to determine whether or not a point cloud registration between the first 200 and second 202 sets of data points is invalid.

It will be appreciated that other characteristics of voxels of the first 400 and second 402 voxel grids can also be utilised to determine whether a point cloud registration between the first 200 and second 202 sets of data points are invalid.

In some examples, the characteristic to be compared can comprise classifications as to whether or not the respective first and second voxels are free space or occupied, i.e. whether the voxels correspond to free space in the environment or not. For example, the first and second characteristics of third 412 and fourth 414 voxels, illustrated in FIG. 4, which form a spatially aligned pair of voxels can comprise respective classifications of free space and occupied. Where, for example, it is determined that the third voxel 412 is indicative of free space in the first set 200 of data points, and that that fourth voxel 414 is indicative of occupied space in the second set 202 of data points, it can be determined that a conflict exists between the third 412 and fourth 414 voxels. Of course, any other classification discussed in detail herein is contemplated (which may, in some examples, be used in alternative examples or in conjunction with the free space classification).

It will be appreciated that even for a valid point cloud registration between the first 200 and second 202 sets of data points, there may be some pairs of voxels that are in conflict with one another, i.e. there may be some pairs of voxels where one voxel indicates free space and the other indicates occupied space. Therefore, in some examples a count of pairs of voxels in conflict in the first 400 and second 402 voxel grids can be kept, with a similarity metric determined based at least in part on the count, and a determination as to whether or not a point cloud registration between the first 200 and second 202 sets of data points is invalid based at least in part on the similarity metric.

In some examples, the similarity metric can be determined by the equation $$\text{similarity metric} = \frac{c_{ab}}{n_a} + \frac{c_{ba}}{n_b}$$

where $c_{ab}$ is the number of occupied voxels in a point cloud a that are found in disagreement with the observed free space voxels in a point cloud b, $c_{ba}$, is the number of occupied voxels in a point cloud b that are found in disagreement with the observed free space voxels in a point cloud a, $n_a$ is the number of occupied voxels associated with point cloud "a" (the first data point set), and $n_b$ is the number of occupied voxels associated with point cloud "b" (the second data point set). The similarity metric can then be compared to an appropriate threshold value for a given point cloud registration to determine whether or not a point cloud registration between the first 200 and second 202 sets of data points is invalid.

Figure 6:
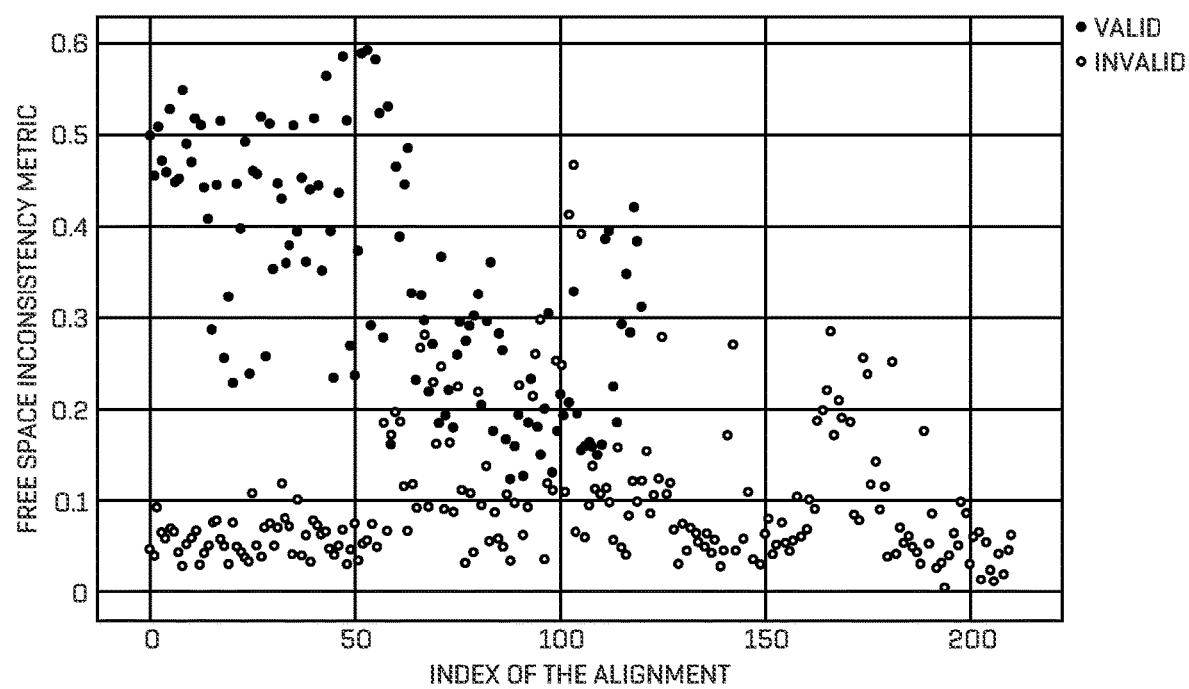
FIG. 6 is a plot illustrating an inconsistency metric for a number of point cloud registrations.

An illustrative plot of similarity metric for a number of point cloud registrations/alignments is shown in FIG. 6. Here the point cloud registrations/alignments have been provided with ground truth labels of VALID or INVALID, as shown in the key. As can be seen from the top-left corner of the plot of FIG. 6, in general those point cloud registrations having a ground truth label of INVALID have a higher similarity metric than those point cloud registrations having a ground truth label of VALID. It will be appreciated here that a higher similarity metric is actually indicative of a greater dissimilarity. It will of course be appreciated that there are some unclear cases present toward the center of the plot of FIG. 6. From FIG. 6, it can be determined that, in some examples, an inconsistency metric of 0.3 or above can be taken to be a reasonable indicator that a point cloud registration/alignment is invalid.

In some examples, a classification of free space or occupied, i.e. free space or not, for the voxels can be determined based on the number of data points associated with the voxel, i.e. by consideration of cardinalities of the sub-sets of data points associated with the respective voxels of a pair of voxels, or indeed the result of comparisons between a respective cardinality and a cardinality threshold can also be compared. For example the first and second characteristics of third 412 and fourth 414 voxels, illustrated in FIG. 4, which form a spatially aligned pair of voxels can comprise respective cardinalities of third 416 and fourth 418 sub-sets of data points of the first 200 and second 202 sets of data points associated with the third 412 and fourth 414 voxels. The method 300 can then comprise determining, based at least in part on a comparison of the cardinalities to a cardinality threshold, whether a point cloud registration between the first 200 and second 202 sets of data points is invalid.

In some examples, the cardinality threshold can be set such that a cardinality value less than or equal to the cardinality threshold is indicative of a voxel to which the sub-set having that cardinality value belongs is considered to indicate free space in the first 200 or second 202 sets of data points. Where, for example, it is determined that the third voxel 412 is indicative of free space in the first set 200 of data points, and that the fourth voxel 414 is indicative of occupied space in the second set 202 of data points, it can be determined that a conflict exists between the third 412 and fourth 414 voxels. In some examples, the cardinality threshold can comprise a value of 10, or less, such that a voxel with an associated sub-set of data points having 10, or less, data points can be determined as being indictive of free space.

In some examples, whether or not a voxel is determined as occupied or as free space, can be determined at least in part by performing a coarse ray casting algorithm on a respective voxel grid. In particular, ray casting can be utilised to determine occupied and free space voxels, e.g. those voxels associated with non-zero and zero cardinality sub-sets of the first 200 and second 202 sets of data points. By performing ray casting on a voxel, rather than on individual data points, a computational complexity of the ray casting algorithm can be reduced. In such examples, it can be assumed that all voxels through which a ray passes are associated with a free space count, whereas those voxels associated with the position of a point are occupied.

Figure 7:
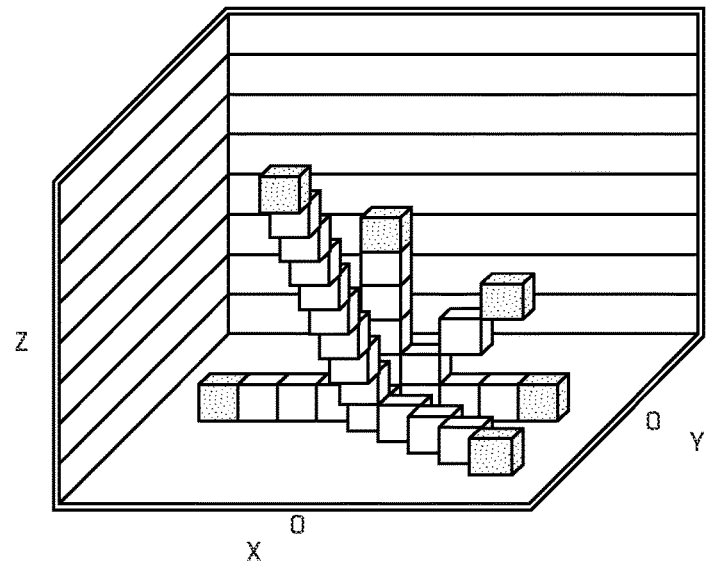
FIG. 7 is a schematic illustration of a ray casting method output.

A simplified illustrative ray casting plot is shown in FIG. 7. As illustrated, shaded voxels are those voxels associated with occupied points, whereas the unshaded boxes are indicative of free space voxels (as determined by rays associated with the occupied voxels passing therethrough).

In some examples, instead of performing ray casting from a single origin point, e.g. ray casting radially outwardly from an origin point of a sensor, ray casting can be performed in a single direction from a plurality of origin points. For example, considering occupied voxels in one of the first 400 and second 402 voxel grids, e.g. ground points, ray casting can be performed in a z-direction, or upward direction, from those occupied voxels, either until the ray hits a further occupied voxel, i.e. a further object, or until the ray has travelled a pre-determined maximum distance away from the initial occupied voxel. In such a manner free space above the occupied voxel, e.g. above a ground voxel, can be determined. Relative to a radial ray casting, casting upwardly from occupied voxels (or from any other direction and/or originating at any relative level) can result in fewer gaps in data, as, for example, in a radial ray casting method rays are not cast toward free space such as the sky. Furthermore, such a ray casting method can take place without knowledge of a sensor origin point, can be run on an entire map, and can reduce the need for a voxel to be traced from all points along a trajectory of a vehicle. Additionally, or alternatively, such a method of ray casting (e.g., along a direction for each voxel in a plane) may aid in the speed of such processing by enabling computation and ray casting in parallel (e.g., by utilizing parallel computation enabled by General Purpose Graphics Processing Units (GPGPUs)).

It will be appreciated that such a ray casting method may find utility in a wide range of applications. For example, such a ray casting method may find utility in a change detection process between two maps. Although described in relation to voxels, it will be appreciated that in some example such ray casting can be performed on a data point basis.

From the discussion above, it will be appreciated that three methods have been discussed that determine a similarity metric to enable a determination as to whether or not a point cloud registration between the first 200 and second 202 sets of data points is invalid, a first method utilising the L1/Manhattan distance between two histograms representative of voxel similarity based on semantic classification labels, a second method utilising a Pearson chi-squared test on two histograms representative of voxel similarity based on semantic classification labels, and a third method based on inconsistencies between occupied and free space in voxel grids corresponding to the first 200 and second 202 sets of data points. These three methods can be thought of as classifiers for classifying whether a given point cloud registration/alignment is invalid or valid.

In some examples, point cloud registrations determined to be invalid can be discarded from any subsequent pose estimation algorithm utilised as part of a HD map building process.

In some examples, a weighting to be assigned to the point cloud registration can be determined, based at least in part on whether or not the point cloud registration between the first and second sets of data points is determined to be invalid, and such a weighting can be utilised in a process to determine a map of the environment 108 of the vehicle 102 of FIG. 1.

In particular, a map building process can include a pose estimation problem to determine s consistent set of poses (and hence a consistent map) that agree with all the factors/measurements, and such a pose estimation problem can be a weighted non-linear least squares optimization problem. This can be solved in an iterative manner using optimization techniques such as Gauss-Newton or Levenberg-Marquardt techniques.

A cost function for the pose estimation problem can be given by:

$$c = \Sigma_i e_i^T \Lambda_i^{-1} e_1$$

where $e_i$ is the difference between observed and predicted measurements, and $\Lambda_i$ is the covariance matrix associated with the measurement/factor. The covariance matrix can specify a confidence level for a measurement. The larger the covariance matrix, the less confidence in the measurement/factor, and that measurement/factor then has a lower weight in the optimization problem.

In some examples, the weighting to be assigned to the point cloud registration can comprise a scalar weighting $w_i$ associated with the covariance in the following manner, such that the effective covariance becomes:

$$\Psi_i = w_i \Lambda_i$$

By utilising such weighting, for example as opposed to rejecting point cloud registrations determined to be invalid before implementing the pose estimation optimization, the pose estimation optimization problem can utilize all of the available information and re-classify any misclassified VALID factors if they agree with final optimization solution or likewise for any misclassified INVALID factors. This may improve the precision-recall of the overall system.

In some examples, the weighting can be a fixed weighting based on whether a point cloud registration is determined to be invalid via the method 300. In some examples, the weighting can be optimized as part of the pose estimation optimization problem.

In some examples, a map determined in accordance with the disclosures herein can be deployed in the vehicle 102, or indeed any other vehicle, for subsequent use, for example as part of a vehicle navigation procedure or the like.

In some examples, the method 300 can comprise determining, based at least in part on any of a pose characteristic and an environmental characteristic, whether the point cloud registration between the first 200 and second 202 sets of data points is invalid. The pose characteristic can comprise information corresponding to the pose of the vehicle to which the respective first 200 and second 202 sets of data points correspond. For example, where compass directions associated with the first 200 and second 202 sets of data points, i.e. compass directions associated with a pose at which the first 200 and second 202 sets of data points were obtained, are misaligned in the first 400 and second 402 voxel grids, the point cloud registration can be determined to be invalid. The environmental characteristic can comprise a characteristic associated with one or more static objects present in the environment corresponding to the first 200 and second 202 sets of data points. For example, where a building in the environment corresponding to the first 200 and second 202 sets of data points comprises a linear surface, an invalid point cloud registration can be determined when lines drawn normal to such a surface don't match between the first 400 and second 402 voxel grid representations. It will be appreciated that other pose and environmental characteristics are also envisaged.

As described herein, projection of LIDAR data into multiple voxel spaces may comprise multiple voxel spaces which are coaligned and determining a transformation of the data. It should be noted that such techniques may be equally performed by using multiple voxel spaces aligned at a constant pose relative to a pose of the vehicle and subsequently transforming the voxel space itself and locating the closest voxel in the transformed voxel space for performing the function.

Figure 8:
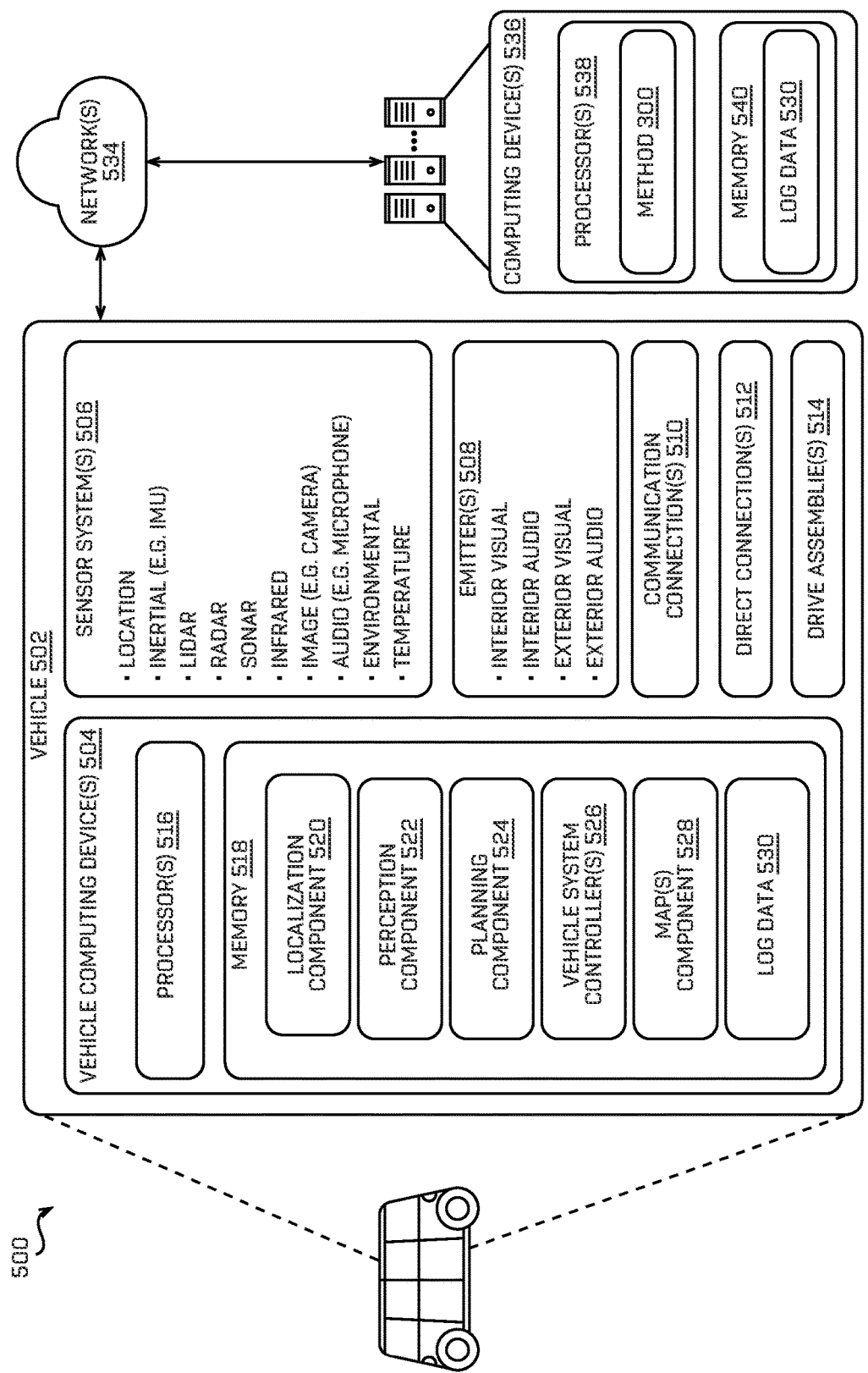
FIG. 8 is a second schematic illustration of a system comprising a vehicle and one or more computing device(s).

FIG. 8 is a block diagram illustrating an example system 500 for implementing some of the various technologies described herein. In some examples, the system 500 may include one or multiple features, components, and/or functionality of examples described herein with reference to other figures.

The system 500 may include a vehicle 502. In some examples, the vehicle 502 can include some or all of the features, components, and/or functionality described above with respect to the vehicle 102. The vehicle 502 can comprise a bidirectional vehicle. As shown in FIG. 8, the vehicle 502 can also include a vehicle computing device 504, one or more sensor systems 504, one or more emitters 508, one or more communication connections 510, one or more direct connections 512, and/or one or more drive assemblies 514.

The vehicle computing device 504 can, in some examples, include one or more processors 516 and memory 518 communicatively coupled with the one or more processors 516. In examples, the one or more processors 516 may execute instructions stored in the memory 518 to perform one or more operations on behalf of the one or more vehicle computing devices 504.

The memory 518 of the one or more vehicle computing devices 504 can store a localization component 520, a perception component 522, a planning component 524, one or more vehicle system controllers 526, a map(s) component 528, and log data 530. Though depicted in FIG. 8 as residing in memory 518 for illustrative purposes, it is contemplated that the localization component 520, perception component 522, planning component 524, one or more vehicle system controllers 526, map(s) component 528, and/or the log data 530 can additionally, or alternatively, be accessible to the vehicle 502 (e.g., stored on, or otherwise accessible from, memory remote from the vehicle 502, such as memory 540 of one or more computing devices 536).

In at least one example, the localization component 520 can include functionality to receive data from the sensor system(s) 506 to determine a position and/or orientation of the vehicle 502 (e.g., one or more of an x-, y-, z-position, roll, pitch, or yaw). For example, the localization component 520 can include and/or request/receive a map of an environment and can continuously determine a location and/or orientation of the autonomous vehicle within the map. In some instances, the localization component 520 can utilize SLAM (simultaneous localization and mapping), CLAMS (calibration, localization and mapping, simultaneously), relative SLAM, bundle adjustment, non-linear least squares optimization, or the like based on image data, lidar data, radar data, IMU data, GPS data, wheel encoder data, and the like captured by the one or more sensor systems 506 or received from one or more other devices (e.g., computing devices 536) to accurately determine a location of the autonomous vehicle. In some instances, the localization component 520 can provide data to various components of the vehicle 502 to determine an initial position of the autonomous vehicle for generating a trajectory and/or for determining to retrieve map data. In various examples, the localization component 520 can provide data to a web-based application that may generate a data visualization associated with the vehicle 502 based at least in part on the data. In some examples the determined position and/or orientation of the vehicle 502 can be measured with reference to coordinate systems that are updated in response to pre-determined conditions being met, as previously described.

In some instances, the perception component 522 can include functionality to perform object tracking, detection, segmentation, and/or classification. In some examples, the perception component 522 can provide processed sensor data that indicates a presence of an entity that is proximate to the vehicle 502 and/or a classification of the entity as an entity type (e.g., car, pedestrian, cyclist, animal, building, tree, road surface, curb, sidewalk, unknown, etc.). In additional and/or alternative examples, the perception component 522 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc. In some instances, the perception component 522 may provide data to a web-based application that generates a data visualization associated with the vehicle 502 based at least in part on the data. In some examples the determined position of detected entities can be measured with reference to coordinate systems that are updated in response to pre-determined conditions being met, as previously described. In some examples, the perception component 522 can perform the functionality described in relation to the semantic segmentation component 132 and a filter component 134 of the vehicle 102 of FIG. 1.

In general, the planning component 524 can determine a path for the vehicle 502 to follow to traverse through an environment. For example, the planning component 524 can determine various routes and trajectories and various levels of detail. For example, the planning component 524 can determine a route to travel from a first location (e.g., a current location) to a second location (e.g., a target location). For the purpose of this discussion, a route can be a sequence of waypoints for travelling between two locations. As examples, waypoints may include streets, intersections, global positioning system (GPS) coordinates, etc. Further, the planning component 524 can generate an instruction for guiding the autonomous vehicle along at least a portion of the route from the first location to the second location. In at least one example, the planning component 524 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 502 to navigate.

In at least one example, the vehicle computing device 504 can include one or more vehicle system controllers 526, which can be configured to control steering, propulsion, braking, safety, emitters, communication, components, and other systems of the vehicle 502. These vehicle system controller(s) 526 can communicate with and/or control corresponding systems of the drive assembly(s) 514 and/or other components of the vehicle 502.

The memory 518 can further include the map(s) component 528 to maintain and/or update one or more maps (not shown) that can be used by the vehicle 502 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment and can be loaded into working memory as needed. In at least one example, the one or more maps can include at least one map (e.g., images and/or a mesh). In some examples, the vehicle 6502 can be controlled based at least in part on the maps. That is, the maps can be used in connection with the localization component 520, the perception component 522, and/or the planning component 524 to determine a location of the vehicle 502, identify objects in an environment, and/or generate routes and/or trajectories to navigate within an environment. Additionally, the maps can be used in connection with the web-based application to generate content associated with the vehicle 502, such as a data visualization.

In some examples, the one or more maps can be stored on a remote computing device(s) (accessible via one or more network(s)). In some examples, multiple maps can be stored based on, for example, a characteristic (e.g., type of entity, time of day, day of week, season of the year, etc.). Storing multiple maps can have similar memory requirements but increase the speed at which data in a map can be accessed. In some examples, the one or more maps can be generated in accordance with the methods described herein.

The memory 518 may also store log data 530 associated with the vehicle. For instance, the log data 530 may include one or more of diagnostic messages, notes, routes, etc. associated with the vehicle. By way of example, if information associated with a notification (e.g., diagnostic message) that is presented on a system interface of the user interface is copied and saved, the information may be stored in the log data 530.

In some instances, aspects of some or all of the memory-stored components discussed herein can include any models, algorithms, and/or machine learning algorithms. For example, in some instances, components in the memory 518 such as the localization component 520, the perception component 522, and/or the planning component 524 can be implemented as a neural network.

As described herein, an exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 506 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), image sensors (e.g., camera, RGB, IR, intensity, depth, etc.), audio sensors (e.g., microphones), wheel encoders, environment sensors (e.g., temperature sensors, humidity sensors, light sensors, pressure sensors, etc.), temperature sensors (e.g., for measuring temperatures of vehicle components), etc. The sensor system(s) 506 can include multiple instances of each of these or other types of sensors. For instance, the lidar sensors can include individual lidar sensors located at the corners, front, back, sides, and/or top of the vehicle 502. As another example, the image sensors can include multiple image sensors disposed at various locations about the exterior and/or interior of the vehicle 502. As an even further example, the audio sensors can include multiple audio sensors disposed at various locations about the exterior and/or interior of the vehicle 502. Additionally, the audio sensors can include an array of a plurality of audio sensors for determining directionality of audio data. The sensor system(s) 506 can provide input to the vehicle computing device 504. Additionally, or alternatively, the sensor system(s) 506 can send sensor data, via the one or more networks 534, to the one or more computing device(s) 536 at a particular frequency, after a lapse of a predetermined period of time, in near real-time, etc.

The vehicle 502 can also include one or more emitters 508 for emitting light and/or sound. The emitters 508 in this example include interior audio and visual emitters to communicate with passengers of the vehicle 502. By way of example, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 508 in this example also include exterior emitters. By way of example, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 502 can also include one or more communication connection(s) 510 that enable communication between the vehicle 502 and one or more other local or remote computing device(s). For instance, the communication connection(s) 510 can facilitate communication with other local computing device(s) on the vehicle 502 and/or the drive assembly(s) 514. Also, the communication connection(s) 510 can allow the vehicle 502 to communicate with other nearby computing device(s) (e.g., other nearby vehicles, traffic signals, laptop computers, etc.). The communications connection(s) 510 also enable the vehicle 502 to communicate with a remote teleoperations system or other remote services.

The communications connection(s) 510 can include physical and/or logical interfaces for connecting the vehicle computing device(s) 504 to another computing device (e.g., computing device(s) 536) and/or a network, such as network(s) 534. For example, the communications connection(s) 510 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the direct connection 512 of vehicle 502 can provide a physical interface to couple the one or more drive assembly(s) 514 with the body of the vehicle 502. For example, the direct connection 512 can allow the transfer of energy, fluids, air, data, etc. between the drive assembly(s) 514 and the vehicle 502. In some instances, the direct connection 512 can further releasably secure the drive assembly(s) 514 to the body of the vehicle 502.

In at least one example, the vehicle 502 can include one or more drive assemblies 514. In some examples, the vehicle 502 can have a single drive assembly 514. In at least one example, if the vehicle 502 has multiple drive assemblies 514, individual drive assemblies 514 can be positioned on opposite longitudinal ends of the vehicle 502 (e.g., leading and trailing ends, the front and the rear, etc.).

The drive assembly(s) 514 can include many of the vehicle systems and/or components, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive assembly(s) 514 can include a drive assembly controller which can receive and preprocess data from the sensor system(s) and to control operation of the various vehicle systems. In some examples, the drive assembly controller can include one or more processors and memory communicatively coupled with the one or more processors. The memory can store one or more systems to perform various functionalities of the drive assembly(s) 514. Furthermore, the drive assembly(s) 514 can also include one or more communication connection(s) that enable communication by the respective drive assembly with one or more other local or remote computing device(s). In such a manner parameters relating to the drive assembly(s) 514, for example relating to the high voltage battery, can be transmitted to the computing device 536.

The computing device(s) 536 can include one or more processors 538 and memory 540 that may be communicatively coupled to the one or more processors 638. In some examples the computing device(s) 536 can store log data 530 or other vehicle information transmitted via the communication connection(s) 510. In some example the processor(s) 538 of the computing device(s) 536 can perform the method 300 described herein.

The processor(s) 516 of the vehicle 502 and the processor(s) 538 of the computing device(s) 536 can be any suitable processor capable of executing instructions to process data and perform operations as described herein. By way of example and not limitation, the processor(s) 516 and 538 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 518 and 540 are examples of non-transitory computer-readable media. The memory 518 and 540 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

As can be understood, the components discussed herein are described as divided for illustrative purposes. However, the operations performed by the various components can be combined or performed in any other component. It should be noted that while FIG. 12 is illustrated as a distributed system, in alternative examples, components of the vehicle 502 can be associated with the computing device(s) 536 and/or components of the computing device(s) 536 can be associated with the vehicle 502. That is, the vehicle 502 can perform one or more of the functions associated with the computing device(s) 536, and vice versa.

Example Clauses

A: A system comprising a LIDAR sensor; and one or more processors configured to: receive a first set of LIDAR data points associated with a first position and orientation of a first vehicle in an environment; receive a second set of LIDAR data points associated with a second position and orientation of a second vehicle in the environment; associate the first set of LIDAR data points with a first voxel grid comprising a plurality of first voxels, a first voxel associated with a first sub-set of the first set of LIDAR data points; determine, based at least in part on the associated first sub-set of the first set of LIDAR data points, respective first characteristics of the first voxels; associate the second set of LIDAR data points with a second voxel grid comprising a plurality of second voxels, a second voxel associated with a corresponding second sub-set of the second set of LIDAR data points; determine, based at least in part on the associated second sub-set of the second set of LIDAR data points, respective second characteristics of the second voxels; determine a pair of first and second voxels that are at least partially aligned; determine, based at least in part on a comparison between the first characteristic of the first voxel of the pair and the second characteristic of the second voxel of the pair, a similarity metric; determine, based at least in part on the similarity metric, whether a point cloud registration between the first and second sets of LIDAR data points is invalid; assign, based at least in part on the determination as to whether the point cloud registration between the first and second sets of LIDAR data points is invalid, a weight to the point cloud registration; determine, based at least in part on the weight, the first set of LIDAR data points, and the second set of LIDAR data points, a map; and transmit the map to an additional vehicle configured to be controlled based at least in part on the map.

B: A system according to Clause A, wherein: the first characteristics comprise first classification labels of the respective first sub-set of LIDAR data points associated with the first voxel; the second characteristics comprise second classification labels of the respective second sub-set of LIDAR data points associated with the second voxel; and the one or more processors are configured to determine, based at least in part on dissimilarities between the first and second classification labels of the first and second voxels of the pair, whether the point cloud registration between the first and second sets of LIDAR data points is invalid.

C: A system according to Clause A or Clause B, wherein the one or more processors are configured to: for the pair of first and second voxels, determine, based at least in part on the first classification labels, a first distribution of classification labels; determine, based at least in part on the second classification labels, a second distribution of classification labels; and determine, based at least in part on a comparison between the first and second distributions of classification labels, the similarity metric.

D: A system according to any of clauses A to C, wherein: the first and second characteristics comprise classifications as to whether the respective first and second voxels are free space or occupied; and the one or more processors are configured to determine whether the respective first and second voxels are free space or occupied based on at least one of a ray casting and a comparison of a number of LIDAR data points in the first and second sub-sets of data points to a threshold value.

E: A method comprising: obtaining first and second sets of data points corresponding to respective first and second poses of a vehicle in an environment; determining first and second voxel grids corresponding to the first and second sets of data points; determining a pair of voxels between the first and second voxel grids, the pair of voxels at least partially aligned with one another; determining, based at least in part on a comparison between a first characteristic of a first voxel of the pair and a second characteristic of a second voxel of the pair, a similarity metric; and determining, based at least in part on the similarity metric, whether a point cloud registration between the first and second sets of data points is invalid.

F: A method according to Clause E, wherein: the first characteristic comprises first classification labels of a respective first sub-set of data points of the first set of data points associated with the first voxel; the second characteristic comprises second classification labels of a respective second sub-set of data points of the second set of data points associated with the second voxel; and the method comprises determining, based at least in part on dissimilarities between the first and second classification labels of the first and second voxels of the pair, the similarity metric.

G: A method according to Clause F, wherein the method comprises; for the pair of voxels, determining, based at least in part on the first classification labels, a first distribution of classification labels; determining, based at least in part on the second classification labels, a second distribution of classification labels; determining, based at least in part on a comparison between the first and second distributions, the similarity metric.

H: A method according to any of Clauses E to G, wherein the method comprises: determining a plurality of pairs of first and second voxels between the first and second voxel grids; determining, for the plurality of pairs and based at least in part on an associated plurality of characteristics, a plurality of similarity metrics; and determining, based at least in part on the plurality of similarity metrics, a distribution of similarity metrics, wherein determining whether the point cloud registration is invalid is based at least in part on the distribution of similarity metrics.

I: A method according to Clause H, wherein determining whether the point cloud registration is invalid comprises determining an expected value of the distribution of similarity metrics, and comparing the expected value to a threshold.

J: A method according to any of Clauses E to I, wherein: the first and second characteristics comprise classifications as to whether the respective first and second voxels are free space or occupied; and the method comprises determining whether the respective first and second voxels are free space or occupied based on a comparison of a number of LIDAR data points in the first and second sub-sets of data points to a threshold value.

K: A method according to any of Clauses E to J, wherein: the first and second characteristics comprise classifications as to whether the respective first and second voxels are free space or occupied; and the method comprises determining whether the respective first and second voxels are free space or occupied based on a ray casting.

L: A method according to any of Clauses E to K, wherein: one or more of the first or second characteristic comprises a classification of: free space, occupied space, building, drivable surface, road, vegetation, static object or dynamic object.

M: A method according to any of Clauses E to L, wherein the method comprises: determining, based at least in part on one or more of a position, orientation or environmental characteristic, whether the point cloud registration between the first and second sets of data points is invalid.

N: A method according to any of Clauses E to M, wherein the method comprises disregarding, from the first and second sets of data points, data points indicative of dynamic objects in an environment of the vehicle at the respective first and second poses of the vehicle.

O: A method according to any of Clauses E to N, wherein the first and second sets of data points comprise data from one or more of LIDARs, cameras, or radars.

P: A method according to any of Clauses E to O, wherein the method comprises: determining, based at least in part on whether the point cloud registration between the first and second sets of data points is invalid, a weight assigned to the point cloud registration; and determining, based at least in part on the first and second sets of data points and the weight assigned to the point cloud registration between the first and second sets of data points, a map of an environment of the vehicle.

Q: A method according to Clause P, wherein the method comprises transmitting the map to an additional vehicle configured to be controlled based at least in part on the map.

R: One or more non-transitory computer-readable media storing instructions executable by one or more processors of a system, wherein the instructions, when executed, cause the one or more processors to perform operations comprising: obtaining first and second sets of data points corresponding to respective first and second poses of a vehicle in an environment; determining first and second voxel grids corresponding to the first and second sets of data points; determining a pair of voxels between the first and second voxel grids, the pair of voxels at least partially aligned with one another; determining, based at least in part on a comparison between a first characteristic of a first voxel of the pair and a second characteristic of a second voxel of the pair, a similarity metric; and determining, based at least in part on the similarity metric, whether a point cloud registration between the first and second sets of data points is invalid.

S: One or more non-transitory computer-readable media according to Clause R, wherein: the first characteristic comprises first classification labels of a respective first sub-set of data points of the first set of data points associated with the first voxel; the second characteristic comprises second classification labels of a respective second sub-set of data points of the second set of data points associated with the second voxel; and the instructions, when executed, cause the one or more processors to perform operations comprising determining, based at least in part on dissimilarities between the first and second classification labels of the first and second voxels of the pair, the similarity metric.

T: One or more non-transitory computer-readable media according to Clause R or Clause S, wherein: the first and second characteristics comprise classifications as to whether the respective first and second voxels are free space or occupied; and the one or more processors are configured to determine whether the respective first and second voxels are free space or occupied based on at least one of a ray casting and a comparison of a number of LIDAR data points in the first and second sub-sets of data points to a threshold value.

U: A method comprising: obtaining first and second sets of data points corresponding to respective first and second poses of a vehicle; obtaining classification labels of the data points of the respective first and second sets of data points; and determining, based at least in part on dissimilarities between the classification labels for the first and second sets of data points, whether a point cloud registration between the first and second sets of data points is invalid.

While the example clauses described above are described with respect to one particular implementation, it should be understood that, in the context of this document, the content of the example clauses can also be implemented via a method, device, system, computer-readable medium, and/or another implementation. Additionally, any of examples A-U may be implemented alone or in combination with any other one or more of the examples A-U.

What is claimed is:

1. A system comprising:
a LIDAR sensor; and
one or more processors configured to:
receive a first set of LIDAR data points associated with a first position and orientation of a first vehicle in an environment;
receive a second set of LIDAR data points associated with a second position and orientation of a second vehicle in the environment;
associate the first set of LIDAR data points with a first voxel grid comprising a plurality of first voxels, a first voxel associated with a first sub-set of the first set of LIDAR data points;
determine, based at least in part on the associated first sub-set of the first set of LIDAR data points, respective first characteristics of the first voxels;
associate the second set of LIDAR data points with a second voxel grid comprising a plurality of second voxels, a second voxel associated with a corresponding second sub-set of the second set of LIDAR data points;
determine, based at least in part on the associated second sub-set of the second set of LIDAR data points, respective second characteristics of the second voxels;
determine a pair of first and second voxels that are at least partially aligned;
determine, based at least in part on a comparison between the first characteristic of the first voxel of the pair and the second characteristic of the second voxel of the pair, a similarity metric;
determine, based at least in part on the similarity metric, whether a point cloud registration between the first and second sets of LIDAR data points is invalid;
assign, based at least in part on the determination as to whether the point cloud registration between the first and second sets of LIDAR data points is invalid, a weight to the point cloud registration;
determine, based at least in part on the weight, the first set of LIDAR data points, and the second set of LIDAR data points, a map; and
transmit the map to an additional vehicle configured to be controlled based at least in part on the map.

2. A system as claimed in claim 1, wherein:
the first characteristics comprise first classification labels of the respective first sub-set of LIDAR data points associated with the first voxel;
the second characteristics comprise second classification labels of the respective second sub-set of LIDAR data points associated with the second voxel; and
the one or more processors are configured to determine, based at least in part on dissimilarities between the first and second classification labels of the first and second voxels of the pair, the similarity metric.

3. A system as claimed in claim 2, wherein the one or more processors are configured to:
for the pair of first and second voxels, determine, based at least in part on the first classification labels, a first distribution of classification labels;
determine, based at least in part on the second classification labels, a second distribution of classification labels; and
determine, based at least in part on a comparison between the first and second distributions of classification labels, the similarity metric.

4. A system as claimed in claim 1, wherein:
the first and second characteristics comprise classifications as to whether the respective first and second voxels are free space or occupied; and
the one or more processors are further configured to determine whether the respective first and second voxels are free space or occupied based on at least one of a ray casting and a comparison of a number of LIDAR data points in the first and second sub-sets of data points to a threshold value.

5. A method comprising:
obtaining first and second sets of data points corresponding to respective first and second poses of a vehicle in an environment;
determining first and second voxel grids corresponding to the first and second sets of data points;
determining a pair of voxels between the first and second voxel grids, the pair of voxels at least partially aligned with one another;
determining, based at least in part on a comparison between a first characteristic of a first voxel of the pair and a second characteristic of a second voxel of the pair, a similarity metric; and
determining, based at least in part on the similarity metric, whether a point cloud registration between the first and second sets of data points is invalid.

6. A method as claimed in claim 5, wherein:
the first characteristic comprises first classification labels of a respective first sub-set of data points of the first set of data points associated with the first voxel;
the second characteristic comprises second classification labels of a respective second sub-set of data points of the second set of data points associated with the second voxel; and
the method comprises determining, based at least in part on dissimilarities between the first and second classification labels of the first and second voxels of the pair, the similarity metric.

7. A method as claimed in claim 6, wherein the method comprises;
for the pair of voxels, determining, based at least in part on the first classification labels, a first distribution of classification labels;
determining, based at least in part on the second classification labels, a second distribution of classification labels; and
determining, based at least in part on a comparison between the first and second distributions, the similarity metric.

8. A method as claimed in claim 5, wherein the method comprises:
determining a plurality of pairs of first and second voxels between the first and second voxel grids;
determining, for the plurality of pairs and based at least in part on an associated plurality of characteristics, a plurality of similarity metrics; and
determining, based at least in part on the plurality of similarity metrics, a distribution of similarity metrics, wherein determining whether the point cloud registration is invalid is based at least in part on the distribution of similarity metrics.

9. A method as claimed in claim 8, wherein determining whether the point cloud registration is invalid comprises determining an expected value of the distribution of similarity metrics, and comparing the expected value to a threshold.

10. A method as claimed in claim 5, wherein:
the first and second characteristics comprise classifications as to whether the respective first and second voxels are free space or occupied; and
the method comprises determining whether the respective first and second voxels are free space or occupied based on a comparison of a number of LIDAR data points in the first and second sub-sets of data points to a threshold value.

11. A method as claimed in claim 5, wherein:
the first and second characteristics comprise classifications as to whether the respective first and second voxels are free space or occupied; and
the method comprises determining whether the respective first and second voxels are free space or occupied based on a ray casting.

12. A method as claimed in claim 5, wherein:
one or more of the first or second characteristic comprises a classification of:
free space,
occupied space,
building,
drivable surface,
road,
vegetation,
static object or
dynamic object.

13. A method as claimed in claim 5, wherein the method comprises:
determining, based at least in part on one or more of a position, orientation or environmental characteristic, whether the point cloud registration between the first and second sets of data points is invalid.

14. A method as claimed in claim 5, wherein the method comprises disregarding, from the first and second sets of data points, data points indicative of dynamic objects in an environment of the vehicle at the respective first and second poses of the vehicle.

15. A method as claimed in claim 5, wherein the first and second sets of data points comprise data from one or more of LIDARs, cameras, or radars.

16. A method as claimed in claim 5, wherein the method comprises:
determining, based at least in part on whether the point cloud registration between the first and second sets of data points is invalid, a weight assigned to the point cloud registration; and
determining, based at least in part on the first and second sets of data points and the weight assigned to the point cloud registration between the first and second sets of data points, a map of an environment of the vehicle.

17. A method as claimed in claim 16, wherein the method comprises transmitting the map to an additional vehicle configured to be controlled based at least in part on the map.

18. One or more non-transitory computer-readable media storing instructions executable by one or more processors of a system, wherein the instructions, when executed, cause the one or more processors to perform operations comprising:
obtaining first and second sets of data points corresponding to respective first and second poses of a vehicle in an environment;
determining first and second voxel grids corresponding to the first and second sets of data points;
determining a pair of voxels between the first and second voxel grids, the pair of voxels at least partially aligned with one another;
determining, based at least in part on a comparison between a first characteristic of a first voxel of the pair and a second characteristic of a second voxel of the pair, a similarity metric;
and determining, based at least in part on the similarity metrics, whether a point cloud registration between the first and second sets of data points is invalid.

19. One or more non-transitory computer-readable media as claimed in claim 18, wherein:
the first characteristic comprises first classification labels of a respective first sub-set of data points of the first set of data points associated with the first voxel;
the second characteristic comprises second classification labels of a respective second sub-set of data points of the second set of data points associated with the second voxel; and
the instructions, when executed, cause the one or more processors to perform operations comprising determining, based at least in part on dissimilarities between the first and second classification labels of the first and second voxels of the pair, the similarity metric.

20. One or more non-transitory computer-readable media as claimed in claim 18, wherein:
the first and second characteristics comprise classifications as to whether the respective first and second voxels are free space or occupied; and
the one or more processors are further configured to determine whether the respective first and second voxels are free space or occupied based on at least one of a ray casting and a comparison of a number of LIDAR data points in the first and second sub-sets of data points to a threshold value.

* * * * *